Sept. 12, 1944. G. A. MOORE 2,357,842
CONTAINER AND METHOD OF FORMING SAME
Filed July 31, 1940 2 Sheets-Sheet 2
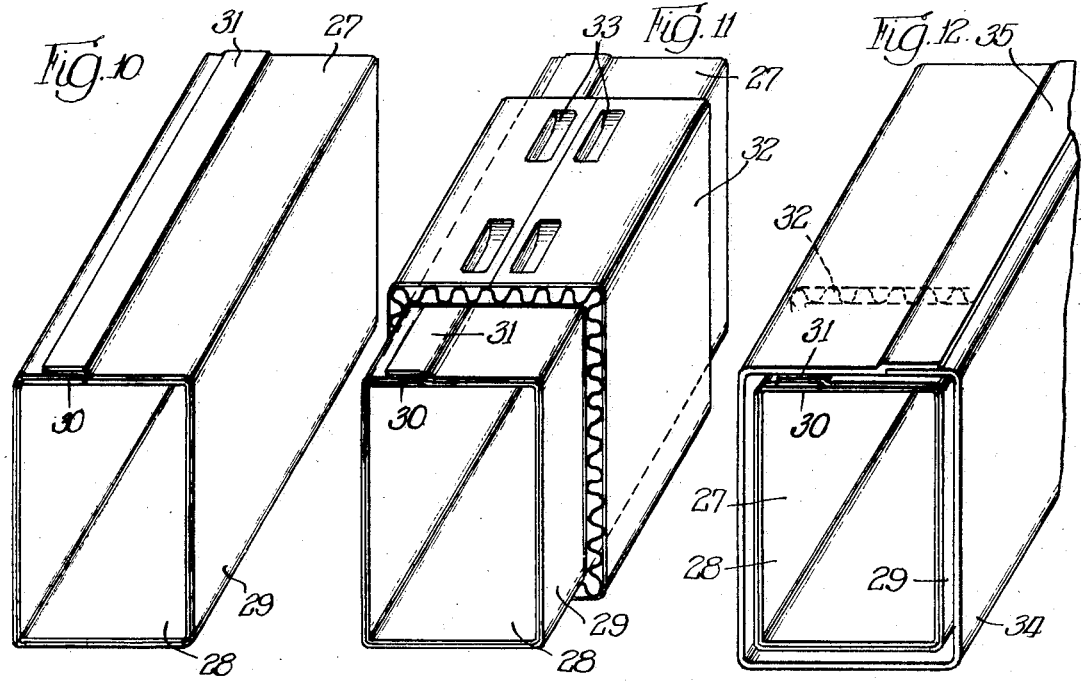
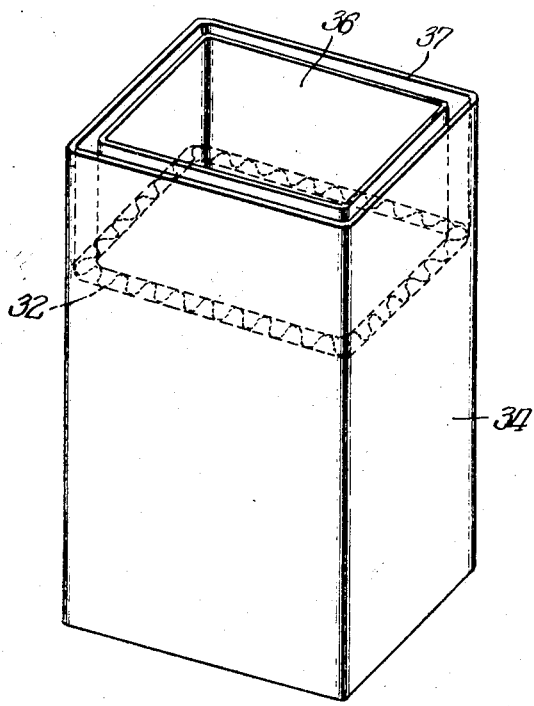
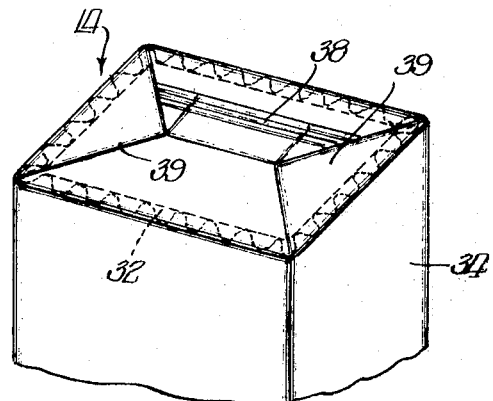
INVENTOR
George Arlington Moore
BY Cromwell, Greist & Warden
ATTORNEYS Patented Sept. 12, 1944

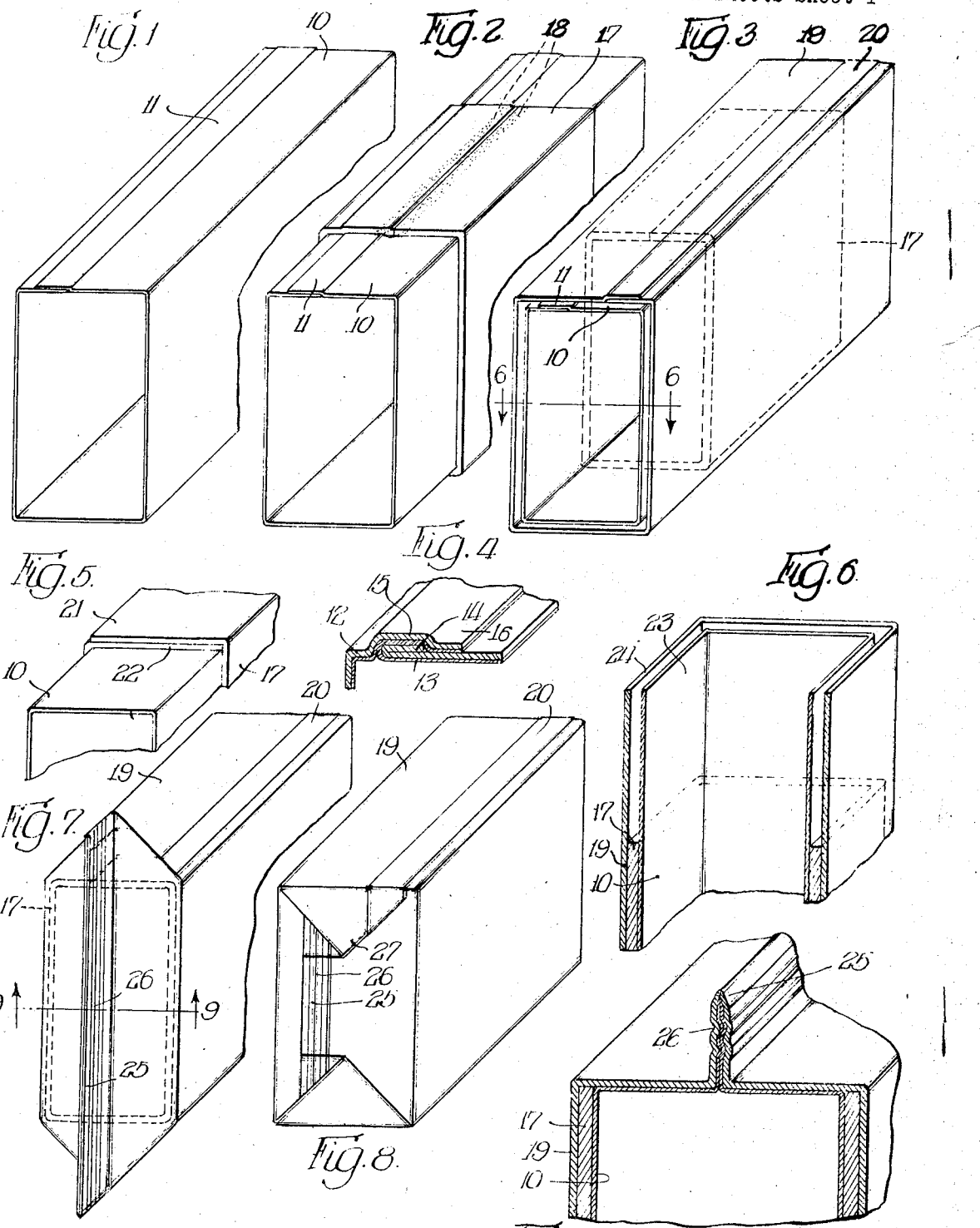

2,357,842

UNITED STATES PATENT OFFICE 2,357,842

CONTAINER AND METHOD OF FORMING SAME

George Arlington Moore, New York, N. Y., assignor to Shellmar Products Company, Mount Vernon, Ohio, a corporation of Delaware Application July 31, 1940, Serial No. 348,799

8 Claims. (Cl. 93—39.1)

The present invention relates to an improved container and method of forming the same and has as a principal object the production of a container from combined materials of the paper and transparent thermoplastic rubber hydrochloride types, the container being provided with a reinforcing member associated with and separating the other two materials.

A type of container which has met with considerable favor in the packaging industry within recent years is produced by combining paper or some other type of protective material with a moisture-impervious pellicle such as transparent thermoplastic rubber hydrochloride. These two different types of material may be in a loose combination or they may be laminated together. In either event the combined materials are formed into container or bag-like shape and sealed in that condition. An objection to containers of this general basis is that they are so flexible as to lose their stability and shape in use.

An additional object of the present invention is the production of a reinforced container in which an inner tube of the rubber hydrochloride is surrounded by a reinforcing sleeve composed of a semi-rigid material such as paper board and this sleeve in turn is encompassed by a paper tube or the like, the end extensions of the paper and transparent rubber hydrochloride being sealed together beyond the reinforcing material to provide a substantially gas-impervious container which will retain its shape in use and which will prevent contamination of sensitive products by the reinforcing material.

A further object of the invention is to provide a combined reinforced and insulated container in which an inner sleeve of rubber hydrochloride is surrounded by a reinforcing and insulating material such as corrugated paper or board, and this reinforcing and insulating material is encompassed by an outer sheet of paper or web material, the end extensions of the paper and rubber hydrochloride web material being sealed beyond the corrugated paper to provide a complete container.

These and other objects will be evident upon a consideration of the following specification and by reference to the accompanying drawings, in which Fig. 1 is a persective view of a tube formed of transparent thermoplastic rubber hydrochloride;

Fig. 2 is a view similar to Fig. 1 and shows the tube being encompassed by a reinforcing sleeve;

Fig. 3 shows the tube and sleeve of Fig. 2 encompassed by a tube of paper;

Fig. 4 is a fragmentary view of a longitudinal seam of a tube similar to Fig. 1 but constructed of paper laminated to the inner layer of transparent rubber hydrochloride;

Fig. 5 shows an alternative method of encompassing the inner tube with a reinforcing member;

Fig. 6 is a sectional view taken along line 6—6 of Fig. 3;

Fig. 7 shows the end extensions of the assembly shown in Fig. 3 sealed together;

Fig. 8 shows the sealed end extension of Fig. 7 folded adjacent the sides of the finished container;

Fig. 9 is a sectional view taken along line 9—9 of Fig. 7;

Fig. 10 is a perspective view of an inner tube formed of rubber hydrochloride and paper;

Fig. 11 shows the inner tube encompassed by a reinforcing and insulating sleeve composed of corrugated paper;

Fig. 12 shows the assembly of Fig. 11 encompassed by an outer sleeve of paper;

Fig. 13 is a perspective view of one end of the assembly shown in Fig. 12; and

Fig. 14 shows the finished package.

In the embodiment of the invention shown in Figs. 1 to 9 an inner tube 10 is formed by overlapping the ends of a sheet of thermoplastic rubber hydrochloride and heat-sealing these overlapped ends together to form a longitudinal seam 11. In some instances it is desirable to produce this inner tube from a thin sheet of paper 12 and an inner pellicle of rubber hydrochloride indicated at Fig. 4 at 13. Where this laminated type of inner tube is employed the longitudinal seam may be produced by turning over an end of the laminated sheet as indicated at 14 and heat-sealing the resulting outer layer of rubber hydrochloride to an opposite end extension 15 of the laminated blank. If desired, an end extension 16 may be heat-sealed to the outer surface of the paper in completing the formation of the tube. In forming the tube the longitudinal seam may be produced by wrapping the material about a mandrel provided with a rubber longitudinally extending insert and pressing a heat-sealing element against the overlapped materials above the rubber insert so that the transparent rubber hydrochloride is thermally sealed to itself, thereby providing a continuous inner surface of rubber hydrochloride.

After formation of the tube, and preferably while the tube is still encompassing the mandrel, a reinforcing member 17 composed of a material such as paper board is wrapped about the tube and mandrel as shown in Fig. 2. The inner portion of the edges of the sleeve 17 preferably is provided with a thermoplastic adhesive line 18, and after the reinforcing member is placed with its edges in abutting relation a heating unit is pressed downwardly to activate the thermoplastic lines of adhesive and to cause them to adhere to the tube 10. A suitable adhesive consists of a dry film of thermoplastic lacquer such as chlorinated rubber adapted to be activated by heat and pressure.

The third operation in the formation of the container consists in encompassing the tube and reinforcing sleeve with an outer tube composed of paper, foil or the like. This outer tube 19 is formed by folding a sheet of paper about the mandrel, rubber hydrochloride film, and reinforcing sleeve, and adhesively securing the overlapping ends of the paper together to provide a seam 20. A thermoplastic adhesive may be employed for this purpose if desired and the activation of the adhesive between the overlapped edges of the paper may also be utilized to adhere the paper to the sleeve 17 by means of a line of thermoplastic adhesive applied to the sleeve or to the tube 19.

Various methods of applying the reinforcing sleeve 17 may be employed. In the embodiment shown in Fig. 5, the paper board is passed about the tube 10 in such a manner that its overlapping edges 21 and 22 extend completely across the side of the package. These overlapped ends then may be secured together in any suitable manner such as by a line of thermoplastic adhesive. The paper tube 20 then is formed about the reinforcing sleeve in the manner described above.

It will be noted that the reinforcing sleeve 17 is shorter than the inner tube 10 and the outer tube 20, and that it is positioned substantially centrally with respect to these two tubes. The resulting end extensions 23 and 24 of the rubber hydrochloride lining material and paper, respectively, then extend outwardly beyond the sleeve 17 as will be seen from Fig. 6. The body portion of the container is determined by the dimensions of the reinforcing sleeve and the ends of the container are formed by sealing the end extensions of the rubber hydrochloride and paper beyond the reinforcing sleeve as shown in Figs. 7, 8 and 9. More particularly, the end extensions of the rubber hydrochloride and paper are pressed together to form upwardly extending adjacent lips. The interior of the extensions 24 of the paper tube is provided with a thermoplastic adhesive such as chlorinated rubber or any suitable lacquer which will adhere to the extension 23 of the rubber hydrochloride. The upwardly extending lips then are heated and compressed together to provide a central end seam 25. This seam preferably is beaded as shown at 26 to increase its lock and strength. The thermoplastic nature of the extension 23 of rubber hydrochloride causes the paper and rubber hydrochloride to weld together and the opposite but adjacent faces of the extensions 23 also are welded together into a unitary construction. The presence of a thermoplastic coating on the interior of the paper extension 24 is not necessary to obtain this unitary construction, since the rubber hydrochloride itself is sufficiently thermoplastic to weld to the paper upon the application of heat and pressure.

In this construction it will be noted that the reinforcing member 17 is positioned between the inner tube 10 of rubber hydrochloride and the outer tube 20 of paper. In the body portion of the container between the ends of the sleeve 17 the rubber hydrochloride and paper are not secured together, although these materials may or may not be attached to the reinforcing member. On the ends of the container the extensions are folded together so that the paper and rubber hydrochloride are in contiguous relation, as will be seen in Fig. 9. The entire end structure is welded together to form the unitary lip 25 and the container is completed by folding this lip 25 downwardly adjacent the end of the container as shown in Fig. 8 and folding the extensions 27 of the lip 25 over on top of the lip.

Both ends of the container may be formed in the same manner, it being understood that the commodity which is to be packaged in the container normally will be added after one end of the container is formed in the manner described.

In the embodiment of the invention shown in Figs. 10 to 14, the inner tube 27 is formed by laminating a sheet of transparent thermoplastic rubber hydrochloride 28 to an outer sheet of paper 29 and overlapping one end of the resulting blank to an extension 30 of the rubber hydrochloride sheet and paper and welding the overlapped portion to form a seam 31. As described in connection with the embodiment of the invention shown in Figs. 1 to 9, it is preferred that the tube be formed by encompassing the blank about a hollow mandrel having a longitudinally extending rubber insert and heat-sealing the seam against the rubber insert. Without taking the resulting tube 27 from the mandrel a sleeve 32 of corrugated paper is wrapped about the exterior of the tube 27. In order to secure the sleeve 32 to the tube a die may be employed to form the depressions 33 in the corrugated paper, thereby providing sufficiently close contact between a heating element inserted in the depressed portion and a suitable thermoplastic applied on the inner face of the sleeve 32 and the tube 27. This thermoplastic may be pre-applied to the interior surface of the sleeve 32 adjacent the portions to be depressed as shown at 33, or, the thermoplastic may be applied to the exterior surface of the paper sheet 29. Where the tube 27 is formed of the rubber hydrochloride alone, the application of heat to the impressions 33 may be sufficient to secure the tube to the sleeve by the activating of the rubber hydrochloride itself. Since this may tend to weaken the package it is preferred to employ an additional adhesive such as, for example, a thermoplastic lacquer. Any other suitable method of assembling the sleeve 32 with the tube 27 may be employed. For example, a strip of tape may be placed across the abutting edges of the corrugated paper.

After assembling the sleeve 32 with the tube 27 a second and outer tube 34 composed of paper or the like is encompassed about the sleeve 32 in the manner shown in Fig. 12 and the overlapping edges of this paper are sealed together to provide a longitudinally extending seam 35.

The extensions 36 and 37 of the rubber hydrochloride and paper, respectively, then are sealed together in the manner described with reference to the embodiment shown in Figs. 1 to 9 to provide a lip 38 having tabs 39 folded over against the end of the container as will be seen in Fig. 14.

The corrugated paper exercises the dual functions of providing a shape-retaining structure for the container and also acts to provide static chambers to thermally insulate the interior of the container. The air spaces between the corrugations of the sleeve 32 have an affecting insulating influence which is desirable in the packaging of many commodities, especially frozen foods. A still further function of the corrugated sleeve 32 is in cushioning the contents of the package. Blows directed against the side of the package are received by the corrugated paper, thereby protecting the interior of the package from the impact of such blows.

In both forms of the invention shown in the drawings the interior rubber hydrochloride sheet is completely independent of the exterior paper sheet except at the closure seam. The bracing member framing the body portion of the container is positioned between the interior rubber hydrochloride sheet and the exterior paper sheet. Several advantages result from this type of construction. One of these advantages is that the interior rubber hydrochloride sheet is protected from damage which may curb puncturing the outer sheet adjacent the body portion. If a sharp object comes into contact with the paper sheet on the exterior of the package this paper sheet may be punctured. However, the bracing member between the paper sheet and the sheet of rubber hydrochloride prevents the latter from suffering the effects of this puncture. Many products are easily contaminated by contact with paper board, as by transfer of taste and odor, and the construction of my improved package protects such products against deleterious contact with the reinforcing member.

It will be recognized that many changes in the structure and procedure described may be made without departing from the scope of the invention as defined in the appended claims.

I claim:

1. The method of forming containers, which comprises forming an inner tube composed of a thermoplastic pellicle, folding a relatively rigid bracing member about said tube, forming an exterior tube about said bracing member, and forming a closure by heat-sealing all extensions of said tubes to provide an hermetic seal.

2. The method of forming a container, which comprises folding a sheet of thermoplastic rubber hydrochloride about a mandrel, heat-sealing margins of said sheet together to form a tube, folding a relatively rigid bracing member about an intermediate portion of said tube, forming a paper tube about said bracing member and inner tube, and heat-sealing the extensions of all of said tubes together to provide end closures.

3. The method of forming a container, which comprises laminating a sheet of paper to a sheet of thermoplastic rubber hydrochloride, folding the laminated construction about a mandrel, heat-sealing the rubber hydrochloride edges of the laminated sheet together to form a tube, providing a body-forming reinforcing member about an intermediate portion of said tube, forming a paper tube about said body-forming reinforcing member and said laminated tube, and sealing extensions on said tubes together in a unitary closure providing package-forming ends.

4. The process of forming containers, which comprises forming a rubber hydrochloride tube about a mandrel, forming a paper board sleeve about an intermediate portion of said rubber hydrochloride tube, forming a paper outer tube about said paper board sleeve, and heat-sealing together the extensions on said rubber hydrochloride tube and said paper tube beyond said sleeve to provide end closures.

5. A container, comprising an inner layer of a non-fibrous moisture-resistant thermoplastic pellicle, an intermeriate layer of a relatively rigid body-imparting bracing member, and an outer paper layer providing end extensions, said thermoplastic pellicle being sealed in face-to-face contact with itself and all of said extensions on said inner layer and said outer layer being heat-sealed together to provide an end closure beyond said bracing member.

6. A container, comprising an inner tube composed of paper and rubber hydrochloride having a continuous interior rubber hydrochloride surface, a paper board body-imparting reinforcing member encompassing said tube, and an outer paper tube encompassing said reinforcing member and said inner tube, said rubber hydrochloride inner tube being thermally sealed in face-to-face contact and the ends of said inner tube and said outer tube being sealed together to provide a unitary closure.

7. A hermetically sealed container, comprising an inner tube formed of thermoplastic rubber hydrochloride, a corrugated paper body-imparting reinforcing sleeve encompassing an intermediate portion of said rubber hydrochloride inner sleeve, and an outer paper sleeve encompassing said corrugated paper bracing member, said rubber hydrochloride extension being sealed in face-to-face contact and both end extensions on said inner tube and said outer tube being sealed together to provide a unitary closure having an hermetically sealed end.

8. A hermetically sealed container, comprising an inner tube of rubber hydrochloride, an insulating and body-imparting reinforcing member encompassing an intermediate portion of said rubber hydrochloride tube, and an outer paper tube encompassing said insulating and reinforcing sleeve, the extending portions of said inner tube of rubber hydrochloride being sealed in face-to-face relationship and said inner tube and said outer tube having both end extensions sealed together and folded over to provide an hermetically sealed end.

GEORGE ARLINGTON MOORE.